(12) United States Patent
Bednar (10) Patent No.: US 6,662,895 B1
(45) Date of Patent: Dec. 16, 2003

(54) DUAL-PATH SINGLE-PUMP HYDROSTATIC DRIVE FOR MOWER

(75) Inventor: Richard D. Bednar, Lake Mills, WI (US)

(73) Assignee: Textron Inc., Providence, RI (US)

( * ) Notice: Subject to any disclaimer, the term of this patent is extended or adjusted under 35 U.S.C. 154(b) by 192 days.

(21) Appl. No.: 09/594,830

(22) Filed: Jun. 14, 2000

Related U.S. Application Data (60) Provisional application No. 60/139,231, filed on Jun. 14, 1999.

(51) Int. Cl.$^7$ ................................................ B60K 17/10
(52) U.S. Cl. ........................................................ 180/308
(58) Field of Search ................................. 180/305, 307, 180/308, 315, 6.48

(56) References Cited

U.S. PATENT DOCUMENTS

| | | | |
|---|---|---|---|
| 2,766,834 A | | 10/1956 | Boyer |
| 3,233,691 A | | 2/1966 | Biasi |
| 3,234,856 A | | 2/1966 | Martin |
| 3,443,656 A | | 5/1969 | Stolz |
| 3,613,336 A | | 10/1971 | Smith |
| 3,736,732 A | | 6/1973 | Jennings et al. |
| 3,807,585 A | | 4/1974 | Holzmann |
| 3,865,207 A | | 2/1975 | Schwab et al. |
| 3,901,339 A | | 8/1975 | Williamson |
| 3,913,453 A | | 10/1975 | Parquet |
| 4,069,886 A | * | 1/1978 | Campbell et al. ........... 180/308 |
| 4,401,182 A | * | 8/1983 | Pollman ..................... 180/307 |
| 4,484,655 A | | 11/1984 | Sheppard, Sr. |
| 4,809,796 A | | 3/1989 | Yamaoka et al. |
| RE33,131 E | | 12/1989 | Morrison |
| 4,914,592 A | * | 4/1990 | Callahan et al. ........... 180/6.48 |
| 5,137,100 A | | 8/1992 | Scott et al. |
| 5,158,150 A | * | 10/1992 | Askeland et al. ........... 180/305 |
| 5,181,579 A | | 1/1993 | Gilliem |
| 5,518,079 A | * | 5/1996 | Zvolanek ................... 180/6.48 |
| 5,560,204 A | * | 10/1996 | Ishihama et al. .......... 180/6.48 |
| 5,682,958 A | * | 11/1997 | Kalhorn et al. ............. 180/308 |
| 5,809,755 A | * | 9/1998 | Velke et al. ................ 180/6.48 |
| 5,848,520 A | | 12/1998 | Arfstrom et al. |
| 5,873,427 A | * | 2/1999 | Ferguson et al. ........... 180/307 |
| 5,957,235 A | * | 9/1999 | Nishimura et al. ......... 180/308 |

FOREIGN PATENT DOCUMENTS

AU             290097        9/1964

* cited by examiner

Primary Examiner—Frank Vanaman
(74) Attorney, Agent, or Firm—Harness, Dickey & Pierce, P.L.C.

(57) ABSTRACT

A turf care machine includes a base mounted on a plurality of wheels, a support structure affixed to and extending from the base for supporting a turf machine operator interface, and a hydraulic control system for regulating the speed and direction of the mower. The hydraulic system includes: an engine with a drive shaft; a single hydraulic pump driven by the engine; a first valve set having an inlet connected to the pump outlet; a first hydraulic wheel motor connected to the first valve set; a second valve set connected to the first valve set and to a second hydraulic wheel motor. This drive system has the advantage of using only one pump for driving both drive wheels in a seemingly independent dual path mode of operation, thereby minimizing cost and the number of fluid linkages and parts in such a system.

6 Claims, 5 Drawing Sheets

DUAL-PATH SINGLE-PUMP HYDROSTATIC DRIVE FOR MOWER

CROSS REFERENCE TO RELATED APPLICATION

This application claims the benefit of priority of U.S. provisional application Serial No. 60/139,231 filed Jun. 14, 1999, the entire contents of which are hereby incorporated by reference into the present application.

BACKGROUND OF THE INVENTION

1. Field of the Invention

This invention relates generally to hydraulic drive systems for self-propelled turf care equipment, and more particularly to a dual-path reversible hydrostatic drive system for a steerable turf care machine having a single variable volume hydraulic pump as a source of hydraulic drive power.

2. Discussion

Commercial turf care machines are typically self-propelled and are often equipped with drive mechanisms for both driving and steering the wheels of the machines. These drive mechanisms typically include a mechanism for transferring the driving torque from a source of power such as an internal combustion engine to at least two of the machine wheels, thereby turning the machine wheels and assisting the machine operator in both propelling and maneuvering the piece of equipment.

While both hydraulic and mechanical drive mechanisms have been commonly used in the past, hydraulic drive mechanisms are being implemented in turf care machines on an ever increasing basis due to decreases in the price of such systems. Specifically, hydrostatic drive mechanisms have long been known to exhibit desirable characteristics such as allowing a machine operator to quickly switch between forward, neutral and reverse modes of operation, and to provide for efficient steering of the machines as well. Dual path hydrostatic drives are used on both zero-turn riding mowers and zero-turn walk-behind mowers for a number of years, as is shown in U.S. Pat. No. 3,616,869 to Rilling and U.S. Pat. No. 4,920,733 to Berrios, which are both hereby incorporated by reference. These drive systems feature a dedicated hydraulic pump and hydraulic motor combination for each of the two driving wheels. Typically, the pumps and motors are located near the driving wheels, and the two pumps are driven by a belt powered by a pulley mounted to the output shaft of the internal combustion engine.

One desirable feature of these dual path machines is their ability to turn and maneuver with considerable agility. This is a direct result of each driving wheel being controlled by the operator independently of the other driving wheel. So, while one wheel is being driven forward at a desired speed, the other wheel can be driven, for example, in the opposite direction at the same speed, thereby allowing the turf care machine to turn on its own axis. Commercial riding and walk-behind mowers having a dual path hydrostatic drive system are available from more than a half-dozen different companies.

A turf care machine operator manipulates a typical dual path hydrostatic drive mechanism through a plurality of levers located on an operator/turf machine interface such as a handle bar structure. These operator control systems typically include both traction controls and speed controls to enhance machine operability and maneuverability. A typical traction control for a dual path hydrostatically-driven machine provides the machine operator with selective control between forward, neutral and reverse modes of operation for each driven wheel, while a typical speed control provides the operator with an overall control for regulating the maximum forward speed at which the machine can be operated. State-of-the art traction and speed controls are disclosed in U.S. Pat. No. 5,343,678 to Stuart and U.S. Pat. No. 5,651,241 to Wegner, which are both hereby incorporated by reference. They are also available on various mid-size commercial mowers including those from Textron Turf Care & Specialty Products of Johnson Creek, Wis., such as the Ransomes® Bob-Cat® mid-size mowers Model No. 942215 (a riding mower) and Model No. 930301 (a walk-behind mower), the operations and details of which are respectively described in publicly available Ransomes operator and service manuals.

While the present dual path hydrostatic drive systems that are presently available on commercial turf care machines typically exhibit sufficient performance characteristics, such systems normally require a hydraulic fluid reservoir as well as a pair of reversible variable displacement pumps, thus increasing turf care machine cost. It would therefore be desirable to provide more economic arrangements for the hydraulic drive system which facilitates ease of operation, improves efficiency and/or reduces manufacturing costs.

As such, a first object of the present invention is to provide an improved system for regulating/controlling a hydrostatic drive mechanism of a conventional turf care machine.

A second object of the present invention is to provide an improved system for regulating/controlling the hydrostatic drive system of a turf care machine that allows the operator to adjust the power to the drive system in a way which helps reduce heating of the hydraulic fluid and improves system efficiency.

A third object of the present invention is to provide a system and method for regulating/controlling the hydrostatic drive of a turf care machine that requires only one single pump for driving both drive wheels in a seemingly independent dual path mode of operation, thereby minimizing cost and the number of fluid linkages and parts in such a system.

A fourth object of the present invention is to provide an economically efficient dual-path hydrostatic drive system which has a reduced number of external hydraulic connections for improved system reliability.

SUMMARY OF THE INVENTION

To achieve one or more of the foregoing objects, and in accordance with the teachings of the present invention, a single-pump hydraulic drive system for a steerable, self-propelled wheeled vehicle is provided that is designed and adapted for regulating the operation of a self-propelled mower or other piece of turf care equipment or similar kind of the machine. The system of the present invention finds particular utility for midsize commercial mowers and similar kinds of steerable self-propelled wheeled equipment, typically having a net weight of about 140 kg (about 310 pounds) to about 500 kg (about 1100 pounds), which are manually steered and must often be manipulated around obstacles during operation.

A manually-steered self-propelled wheeled vehicle, such as a commercial mower, according to one embodiment of the present invention, is implemented with a single-pump hydraulic drive system having a pair of control valve sets for controlling the volume and direction of fluid from the single hydrostatic pump to a pair of wheel drive motors. The single hydraulic pump, which is preferably a variable volume pump, functions to provide hydraulic fluid power required to drive the wheels. The pump preferably includes a manually-operated maximum volume adjustment mechanism, such as a movable machine speed lever connected to a rotatable trunnion shaft or other volume control input means on the pump, for selectively setting the desired maximum pump displacement at any desired level, from a fraction of the pump's output, such 20%, all the way up to 100%. Via this machine speed lever, an operator can select the maximum drive speed at which the mower will operate. If desired, this speed control mechanism can be operatively connected in a combined manner on the turf machine so that the speed control lever limits the top speed of the traction controls. The operator traction controls typically include independently-actuated left and right control levers, typically operated by the user's left and right hands, which are mechanically connected via independent linkages to the conventional control valve operators mounted on the first and second valve sets, which valve sets will shortly be described.

The hydraulic pump is connected to a first valve set, which regulates the volume and direction of fluid to the left hydraulic wheel motor. The left wheel motor mechanically drives the mower's left driving wheel, and thus controls the direction and speed of rotation of the left driving wheel. Hydraulic fluid may also be partially or completely shunted or bypassed around the left hydraulic wheel motor by the first valve set, in those operating situations where the left driving wheel is not to be driven at all or is not to be driven at a speed as great as the speed of the right driving wheel. The hydraulic fluid, after traveling back from the left wheel motor into the first valve set, or after being shunted through the first valve set, is then transferred through a suitable fluid conduit to a second valve set. The second valve set regulates the direction and flow of the fluid to the lawn mower's right wheel drive motor. This motor is turn mechanically drives the mower's right driving wheel, and thus controls the direction and speed of rotation of the right driving wheel. Hydraulic fluid may also be partially or completely shunted around the right hydraulic wheel motor by the second valve set, in those situations where the right driving wheel is not to be driven at all or is not to be driven at a speed as great as the speed of the left driving wheel. After the hydraulic fluid leaves the second valve set, it recirculates through a suitable fluid conduct back to the inlet side of the single hydraulic pump.

The first and second valve sets preferably each contain at least one control valve for regulating the volume and direction of hydraulic fluid discharged therefrom. Preferably each control valve has two outlet ports which are directly piped to the associated wheel drive motor. Each control valve also preferably has a pressure inlet port, a pilot bypass port, and a discharge port. One preferred control valve is an infinitely-adjustable five-port three-position proportional directional control valve for selectively directing fluid to its associated wheel motor. The control valve also preferably has a three-position closed center valve spool arrangement. In the forward and reverse positions, the control valve directs hydraulic fluid to the wheel motor in order to respectively run the wheel motor in the forward or reverse direction. Because the control valve is proportional and infinitely positionable, the flow of hydraulic fluid can be adjusted as desired to achieve any desired rate of speed of the associated wheel, including no speed (that is no rotation), which occurs when the valve spool is in its closed center position.

The left and right operator traction control levers and linkages provided on the mower may take on any conventional or suitable form for providing independent mechanical movements to the control operators of the first and second valve sets. Typically, the control operators of the valve sets will be adjustable between full forward, neutral and full reverse positions. As a first example, on a walk-behind mower employing a single-pump hydrostatic drive system of the present invention, these control levers may be hand grip levers of the type conventionally found on walk-behind mowers having a two-pump dual-path hydraulic drive system. As a second example, on a riding mower where the operator is seated, the control levers may be a pair of hand-operable, pivotally mounted, spring-returned-to-neutral levers positioned along side of, or in between the knees of, the seated operator. As a third example, on a stand-up riding or platform mower, the operator traction control levers may be a pair of hand levers or coupling members that are independently movable and preferably are arranged to pivot about a single axis. The control levers may also be limited in their pivotal movement in at least one direction by a lawn mower handle structure upon which they are mounted. As a fourth example, left and right foot-operated control pedals may be provided. In all of these examples, the control operator of the first valve set receives its command as to the desired direction and volume of the fluid flow into the left wheel drive motor from the left-hand (or left foot) traction control lever through the left-hand linkage. Similarly, the control operator of the second valve set receives its command as to the desired direction and volume of fluid flow into the right wheel drive motor from the right-hand (or right-foot) traction control lever through the right-hand linkage. In this manner, the direction and speed of the rotation of the left and right driving wheels may be accurately controlled. Through manipulation of this pair of controls, the left wheel can go in a forward direction at any desired speed while the right wheel is going in a rearward direction at any desired speed (or vice versa). This functionality enables the operator to turn the mower at an effective zero turning radius, if so desired, just like in traditional dual-path machines.

At least two further variations of the first embodiment of the present invention are contemplated. The control valve of each valve set that determines fluid volume and direction may be a spring-returned to closed-center neutral position valve, meaning the hydraulic flow to the associated wheel motor is zero in the absence of external forces applied to shift the valve away from its centered neutral position. Preferably, suitable spring members are provided internally within the control valve to shift its spool to a closed-center neutral position. Alternatively, the control valve may be spring-returned to one of its full open positions. In either variation, the traction control levers and/or their associated linkages may also be provided with spring members to return the control valve to a neutral position when the mower operator releases the traction control levers. Alternatively, as is common with some commercial walk-behind mowers, the traction control levers and/or their associated linkages may be provided with spring members to return the control valve to a full open position, such as full forward, when the mower operator releases the traction control levers.

A second embodiment or aspect of the single-pump hydrostatic drive system of the present invention for steerable self-propelled wheeled vehicles is provided. This second aspect includes all of the same components found in the first embodiment of the invention. It also includes, within each control valve set, a pressure-operated bypass valve, which is also sometimes called a slave-operated volume compensation valve. These bypass valves are preferably infinitely-adjustable three-port two-position pilot-operated control valves that are spring-returned to an open position in the absence of back pressure in a pilot fluid line typically connected to normal outlet port of the bypass valve. Each bypass valve functions to divert all or a portion of the fluid around its respective control valve within its valve set when a particular wheel is not being driven at all or is not being driven at its near maximum rate of speed so as to match the particular pump output flow. These slave-operated bypass valves include opposed pilot lines connected respectively to the inlet port and the pilot bypass port of the associated control valve. Thus, the nearly instantaneous pressures experienced within the fluid conduits connected to the inlet port and the bypass port serve to control the position of the slave-operated bypass valve. When a sufficient pressure backup is detected in the conduit leading to the inlet port of the control valve, the bypass valve diverts part or all of the fluid flow to the discharge port of its valve set. In this manner, the energy-wasting, heat-generating circulation of the hydraulic fluid through the bypass passages and bypass port of the directional control valve is avoided, and the overall speed of response of the hydraulic drive system as a whole is improved. According to this aspect of the present invention, the bypass valves are preferably mounted directly to or adjacent to their associated control valve. Or both valves can be mounted adjacent to one another on a common pre-ported valve mounting plate or manifold block to achieve a single integrated valve set that minimizes the number of external fluid connections that have to be made to each valve set. In addition, if desired, the single pump and the first and second valve sets may be mounted upon a larger common hydraulic manifold block, base or mounting plate to further minimize the number of external fluid connections between these three sets of hydraulic components within the hydrostatic drive system of the present invention. In all versions of the present invention, the valve sets are preferably positioned in relatively close proximity to the hydraulic wheel motors, which typically directly drive the axles of the driving wheels of the turf care machine.

Additional aspects, features, objects and advantages of the present invention will become apparent from a reading of the following detailed description of the preferred embodiments taken in conjunction with the accompanying drawings and appended claims.

BRIEF DESCRIPTION OF THE FIGURES

The drawings form an integral part of the description of the preferred embodiments and are to be read in conjunction therewith. Like reference numerals designate the same or similar components or features in the various Figures, where.

DETAILED DESCRIPTION OF THE PREFERRED EMBODIMENTS

Figure 1:
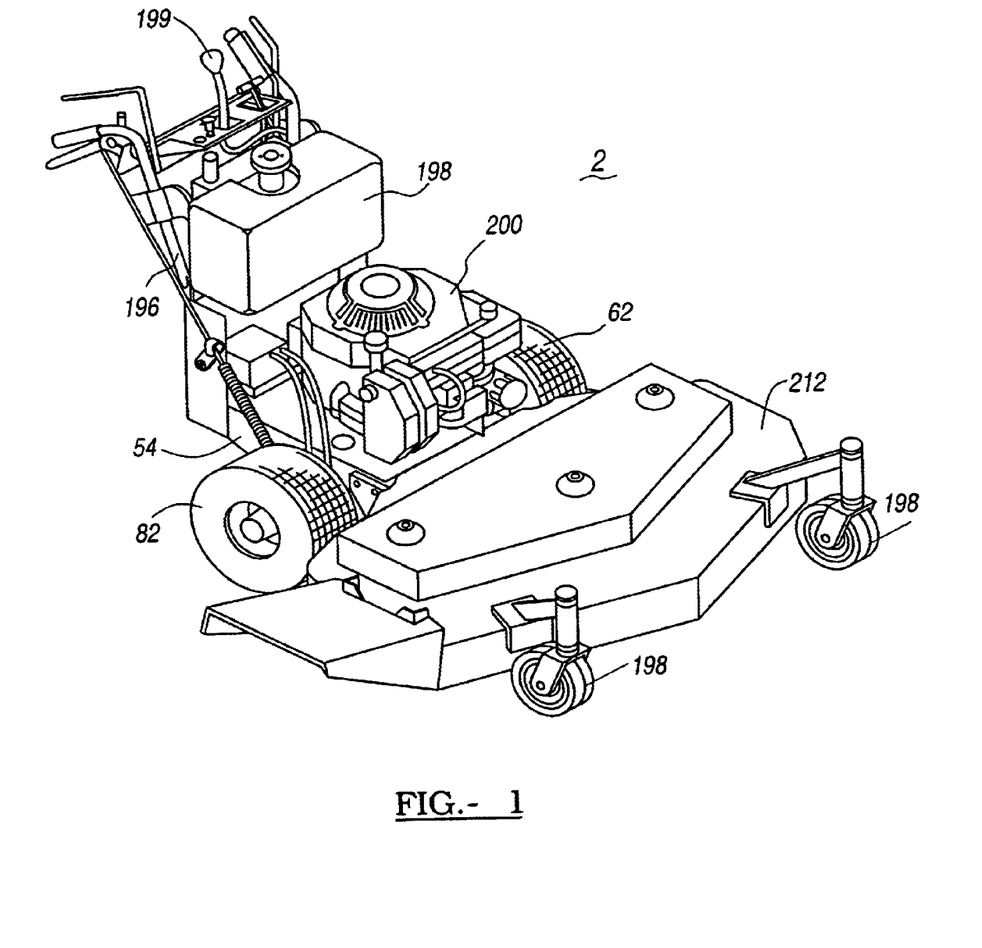
FIG. 1 is a perspective view of a typical walk-behind turf machine incorporating the single-pump hydrostatic drive system of the present invention.

Referring now to the drawings, FIG. 1 shows a typical piece of turf care equipment, namely a zero-turn walk-behind mower, generally at 2 upon which the hydrostatic drive control system of the present invention is implemented. Conventional elements of the turf care equipment 2 are fully described in publicly available Ransomes Hydro Mid-Size Power Units Parts Manual, P/N-2308093 dated March 1995. Although the present invention is described as being implemented in association with a hydrostatic drive mechanism in a turf care machine, it should be understood and appreciated that the hydrostatic drive control mechanism of the present invention is also adaptable for use in any piece of machinery in which a hydrostatic drive mechanism is implemented or may be used.

Figure 2:
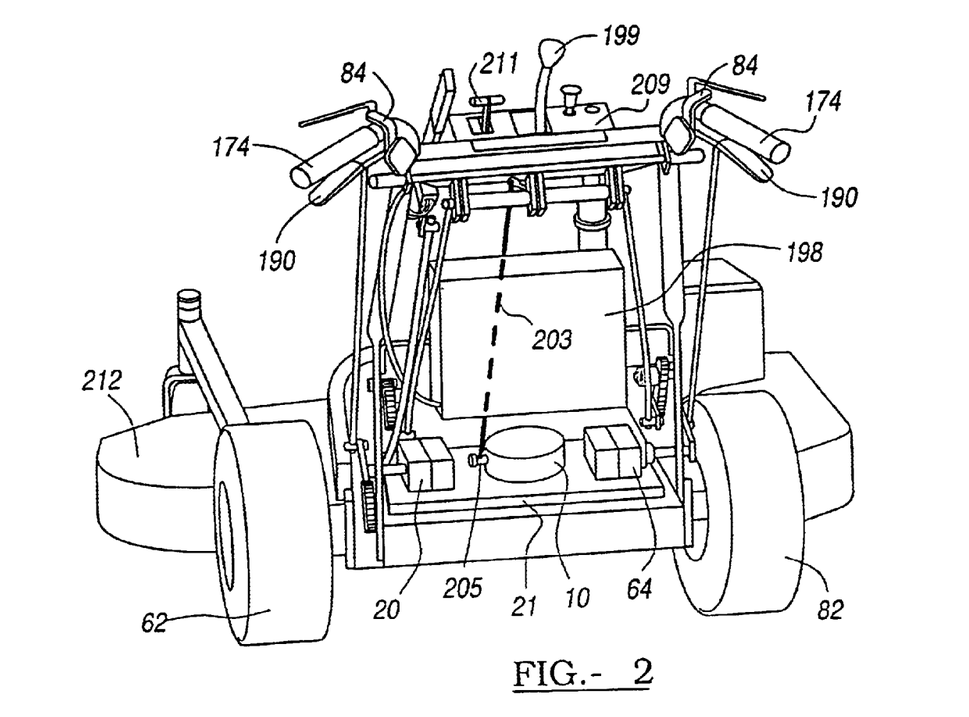
FIG. 2 is an elevational view of the FIG. 1 walk-behind turf machine as viewed from the rear, showing the single hydraulic pump and two valve sets mounted on a common hydraulic manifold bolted to the rear deck of the mower.
Figure 3:
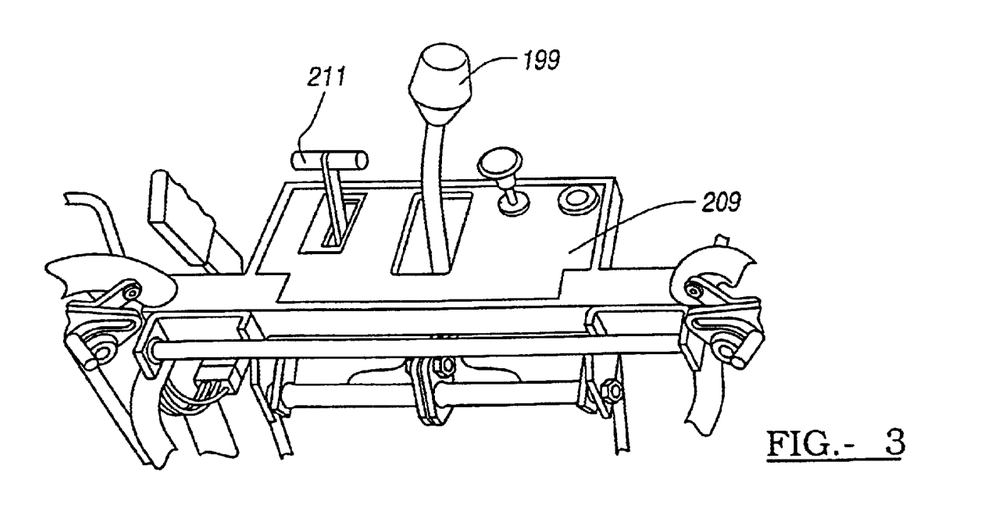
FIG. 3 is an enlarged perspective view of the operator control area of the handle bar structure showing the T-bar engine speed control lever and the centrally located speed control lever for drive pump to set the maximum drive speed.

With reference to FIGS. 1, 2 and 3, the turf machine 2 includes a rear deck frame or base 54 having a handlebar support structure 196 rigidly mounted to and extending upwardly from the base 54. A front frame or mower deck 212 under which belts and cutting blades (not shown) are located extends forwardly from the rear deck or base. The cutter drive belts and rotary grass-cutting blades are implemented under the mower deck as shown and described in publicly available Ransomes Mid-Size Cutter Decks Parts Manual, P/N-2308096. A power source, such as a conventional internal combustion engine shown generally at 200, is mounted to base 54 and provides power to the various components of the machine in any conventional or suitable manner including those well known in the art, such as flexible belt drives or hydraulic pump and motor drives. Turf care machine 2 also includes a fuel tank 198 mounted on the handlebar support structure 196 for storing fuel used by engine 200. In addition a master pump speed control lever 199 is provided near the top of handle bar structure 196 for setting and/or adjusting the maximum displacement of variable volume 10. Lever 199 is connected via a conventional mechanical linkage 203 to the displacement control operator 205 projecting from pump 10. Also provided on the top plate 209 of handlebar structure 196 is a motor speed control lever 211 connected by a conventional mechanical linkage, such as a Bowden cable arrangement (not shown), to the throttle lever (not shown) of motor 200.

Turf care machine 2 includes left rear and right rear driving wheels 62, 82 rotatably attached to base 54 and two front caster-style non-driven wheels 198 attached to mower deck 212. Specifically, rear wheels 62, 82 are preferably attached to and driven by drive mechanisms, including hydraulic drive wheel motors 60, 80 shown in FIG. 3, in a manner that will be described in more detail below. Associated with each hydraulic wheel motor is a valve set 20, 64.

Each valve set 20, 64 is mechanically coupled to control levers 190 found on handle bar structure 174. Also associated with these handle bars 174 are lockable, thumb-operated neutral latch mechanisms 84. These conventional neutral latch mechanisms are of the type as that disclosed in the aforementioned Ransomes Hydro Mid-Size Power Unit Parts Manual. Alternatively, an operator control arrangement of the type described in U.S. Pat. No. 5,343,678 to Stuart may be utilized, and the disclosure of that patent is hereby incorporated herein by reference. The Stuart patent discloses a pair of hand levers or coupling members that are independently movable and preferably are arranged to pivot about a single axis.

Figure 4:
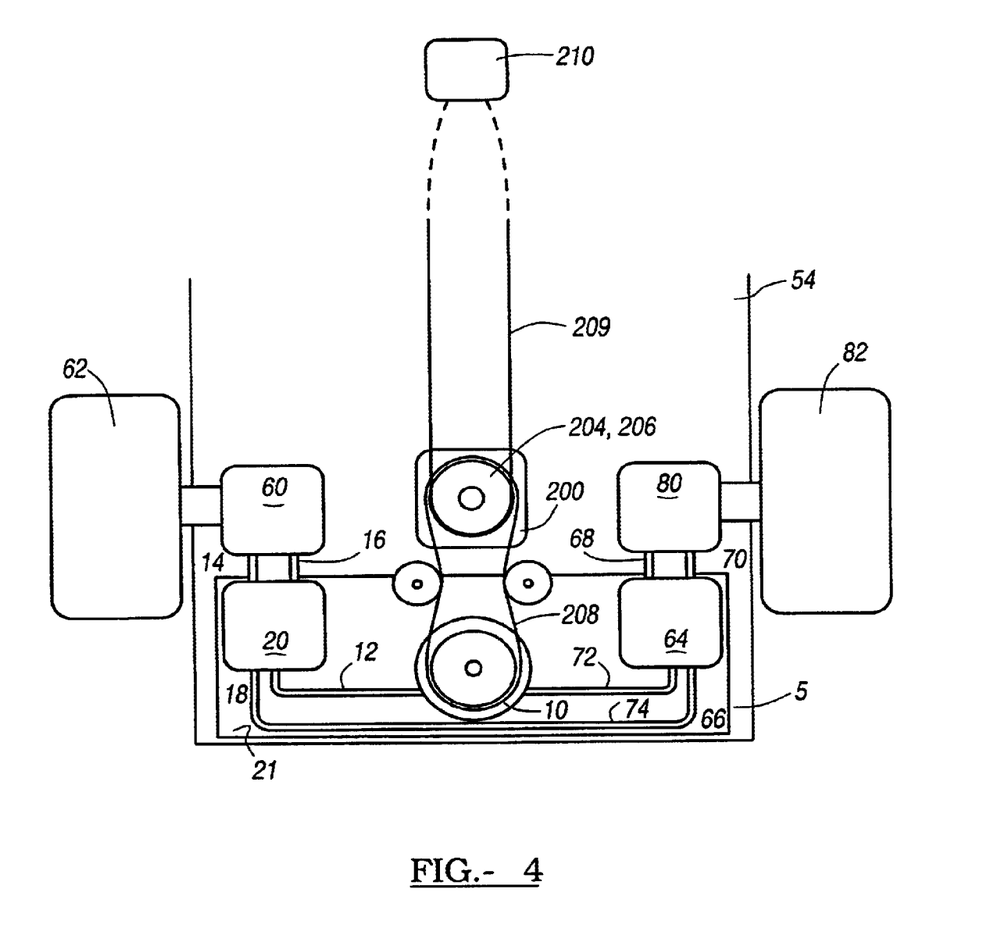
FIG. 4 is a diagrammatic plan view showing one possible lay-out of the various hydraulic and mechanical components of the single-pump dual-path hydrostatic drive system of the present invention generally located on the rear deck of a commercial mower.

Referring to FIG. 4, turf machine 2 includes an internal combustion engine 200, typically having a vertical output shaft, coupled to an concentrically-mounted optional first clutch assembly 204. Assembly 204 may be an electrical or mechanical clutch. Engine 200 is drivingly connected to a variable volume hydraulic pump 10 via first flexible drive belt 208. Alternatively first flexible belt 208 may be driven with conventional tensioner pulley and/or idler pulley arrangement. Either arrangement may be utilized to translate the mechanical rotary power of the output shaft of the engine to a pulley concentrically mounted to the input shaft of pump 10. Also shown concentrically mounted on the engine output shaft is the second optional clutch assembly 206. Assembly 206 is coupled to the cutter blade assembly 210 by drive belt 209. As a first alternative, belt 209 may be coupled via a tensioner pulley and idler pulley arrangement to provide selectively applied mechanical rotary power to the rotary mower blades. As a second alternative, a second hydraulic pump (not shown), driven directly or by belt from the mechanical rotary power of the output shaft of the engine, may be used to power one or more hydraulic motors to drive conventional rotary cutting blades or conventional reel or cylindrical-style cutting blades (not shown). These cutter drive alternatives are well-known and need not be further described.

As shown in FIGS. 2 and 4, variable volume pump 10 is preferably centrally mounted on the rear portion of deck 54, and first and second valve sets 20, 64 are preferably mounted on deck 54 on either side of pump 10. Pump 10 and valve sets 20, 64 are preferably mounted on a common hydraulic manifold 21 to minimize external hydraulic connections between the various ports of pump 10 and the various ports of the individual valves within and between valve sets 20, 64. In this manner, the possibility of leakage from external fittings and lines is minimized, as is required assembly time. Appropriate internal passages for main and pilot fluid flows through the manifold can readily be provided using techniques well known in the art of hydraulic valving and hydraulic manufacture. The hydraulic output from pump 10 is coupled through an appropriately-sized and secured fluid conduit to inlet port 12 of first valve set 20. This conduit, like most of the other fluid lines in the hydraulic circuit diagram, may be an external fluid line or may be an internally plumbed passage provided in manifold 21. First valve set 20 also has outlet ports 14 and 16 in the fluid communication with hydraulic wheel motor 60, and a discharge port 18. The conduits between outlet ports 14 and 16 and motor 60 may be plumbed with rigid hollow fluid-carrying lines, such as tubing or pipe. Or all or part of these lines may be a flexible hydraulic line, such as braided hydraulic hose with metallic pressure-crimped end fittings with appropriate threaded fasteners.

Similarly, second valve set 64, which is identical in terms of function to first valve set 20, has hydraulic output from port 18 coupled through an appropriately-sized and secured fluid conduit to inlet port 66 of second valve set 20. Once again, this conduit, like most of the other fluid lines in the hydraulic circuit diagram, may be an external fluid line or may be an internally plumbed passage provided in manifold 21. Second valve set 64 also has outlet ports 68 and 70 in the fluid communication with hydraulic wheel motor 80, and a discharge port 72. The fluid connection between outlet ports 68 and 70 and wheel motor 80 may be plumbed in the manner described for the fluid lines connected to outlet ports 14 and 16.

Figure 5:
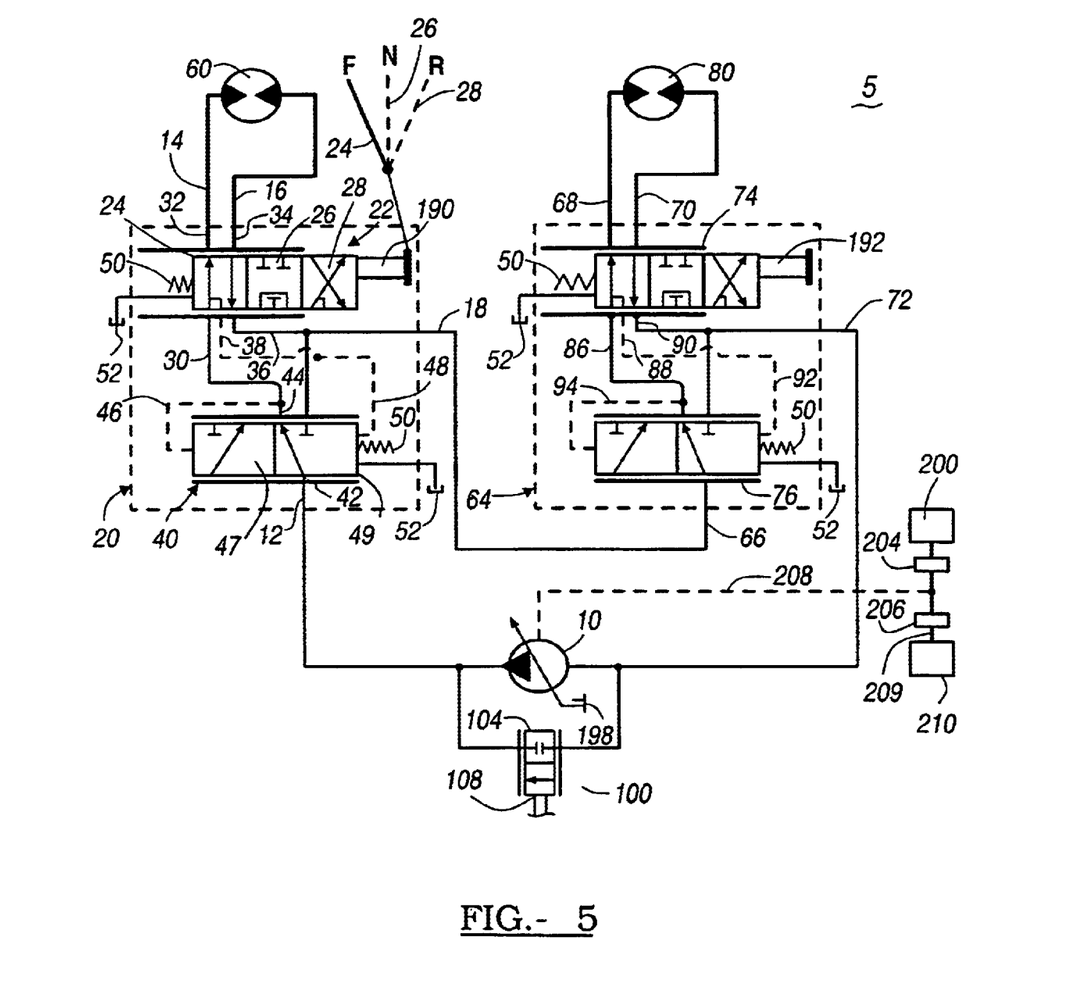
FIG. 5 is a detailed hydraulic diagram of the hydrostatic drive system of the present invention particularly useful for a dual-path walk-behind commercial mower showing the spools of the two control valves being spring-returned to their full-forward open position, and also showing the hydraulic interconnections among the various hydraulic components.

As best seen in FIG. 5, first valve set 20, which functions to regulate the amount and direction of fluid to left wheel drive motor 60. Valve set 20 has a volume control valve 22 and an optional slave-operated bypass valve 40. As shown, valve 22 is preferably an infinitely-adjustable directional control valve having three distinct internal valve spool positions, namely a distinct full forward position represented by (rectangular) envelope 24, a distinct neutral or blocked-center position represented by envelope 26, and a distinct full reverse position, represented by envelope 28. First control valve 22 has a first or inlet port 30, a bypass port 38, and a discharge port 36. Valve 22 also has first and second outlet ports 32 and 34 which are in respective fluid communication with and correspond to first and second outlet ports 14 and 16. When optional slave-operated bypass valve 40 is not provided, inlet port 30 normally is in fluid communication with and may be regarded as corresponding to inlet port 12. Discharge port 36 is in fluid communication with discharge port 18 of first valve set 20. Directional control valve 22 is connected to control lever 190 and return spring 50. The position of the valve spool within valve 22 is determined by the position of manual operator 190, which is connected to left-hand control lever. Pilot bypass outlet 38 is connected to second pilot control inlet 48 of the optional slave-operated volume compensation control valve 40.

As can be seen in FIG. 5, the forward position represented by envelope 24 of valve 20 connects (i.e., establishes open fluid communication between) inlet port 30 to outlet port 32 and connects outlet port 34 to discharge port 36. In addition, there is a fluid path from inlet port 30 to pilot port 38 in envelope 24. In the center position represented envelope 26, outlet ports 32 and 34 are blocked, pilot port 38 is blocked, and inlet port 30 and discharge port 36 are in fluid communication, all as shown. Accordingly, when valve 22 is in its center position, the fluid flowing into inlet port 38 will flow immediately out of outlet port 36 (subject to any pressure drops caused by restricted size passages and orifices), and the fluid will not be directed to or reach hydraulic motor 60. Similarly, the fluid in the lines leading to motor 60 will be blocked, and thus motor 60 and the left wheel connected thereto will effectively be hydraulically braked. In the reverse position represented by envelope 28, inlet port 30 is connected to outlet port 34 and output port 32 is connected to discharge port 36. In addition, pilot port 38 is in fluid communication with inlet port 30. Accordingly, when control valve 22 is in either its full forward position 24 or its full reverse position 28, pilot line 38 will be at substantially the same pressure as is inlet port 30.

A slave-operated bypass or volume compensation valve 40 may optionally be provided within first valve set 20. If valve 40 is not provided, then inlet port 12 is piped directly to inlet port 30, as previously noted. As shown in Figure valve 40 is preferably an infinitely-adjustable proportional control valve having two basic positions or envelopes 47 and 49, three main ports 42, 44 and 45, two pilot ports 46 and 48, and a drain line port 52. Specifically, valve 40 has a first inlet port 42, a first outlet port 44, and second outlet port 45, and a first pilot inlet port 46 and a second pilot inlet port 48. In the first distinct or at-rest position of valve 40, which is represented by envelope 47, inlet port 12 is connected to first outlet port 44, and second outlet port 45 is blocked, as shown. In the second distinct or fully shifted position represented by envelope 49, inlet valve 12 is connected to second output port 45, and first output port 44 is blocked, as shown. Return spring 50 operates to bias valve 40 into its nominal or at-rest position 47, as does sufficient hydraulic pressure on second pilot port 48, provided that it is able to overcome the hydraulic pressure if any being delivered to pilot port 46. Hydraulic pressure on first pilot port 46 which is sufficiently greater than the combined force of the hydraulic pressure at pilot port 48 and the effective pressure generated by return spring 50, causes valve 40 to shift from its at-rest position or to the position represented by envelope 49. Thus, as can be readily understood, pilot ports 46 and 48 function in opposed relation to automatically actuate or bias the valve spool of slave-operated compensation valve 40 to one position or the other. In its first or fully at-rest position 47, bypass valve 40 functions to direct hydraulic fluid from pump 10 delivered to inlet port 12 to outlet port 44 and onto inlet port 30 of valve 22. In its second fully-actuated position 49, bypass valve 40 functions to bypass hydraulic fluid being delivered to inlet port 12 to discharge port 18, thus bypassing directional control valve 22 and left wheel drive motor 60 altogether.

Valve 40 may also assume intermediate positions between positions 47 and 49 if the combined hydraulic forces and its return spring force are sufficiently closely balanced to permit the valve spool to partially shift. In such a blended position, a portion of the fluid being delivered from pump 10 to inlet 12 will be sent through valve 22 hydraulic motor 60, while a portion will be-diverted to discharge ports 45 and 18 so as to go directly to inlet port 66 of second valve set 64.

Control valve 22 and bypass valve 40 may each be provided with a drain line to the low point 52 in the hydraulic system, as shown, if needed. Low point 52 normally will be at the inlet or suction side of pump 10. These optional drain connections help recirculate fluid which has leaked past the valve spools of valve 20 and valve 40.

Also shown in FIG. 5, is an optional two-port, two-position bypass valve 100 connected in parallel with pump 10. Bypass valve 100 is a manually operated valve that has two positions or envelopes 104 and 108. During normal operation of the hydrostatic system, valve 100 is closed, as shown by envelope 104. When opened, as shown by envelope 108, valve 100 allows hydraulic fluid to flow freely around pump 10. At times this may prove convenient when all power on the mower is off, and the mower must be moved manually, since this will allow hydraulic fluid in wheel motors 60 and 80 to circulate in a complete loop through the hydraulic lines of hydraulic drive system 5.

In operation, both valves 22 and 40 are capable of assuming and an almost infinite number of intermediate positions between the distinct valve spool positions. In such blended positions, there is some fluid crossover between certain ports. Specifically, with regard to valve 20, in an intermediate position between fully-forward position 24 and center position 26, there is a portion of the fluid flowing into inlet port 30 being passed to outlet port 32 and thereafter to wheel motor 60, while another portion of the fluid into inlet port 30 is being diverted to discharge port 36. In a similar manner, when the valve 22 is in a blended position partially between the center position 26 and full reverse position 28, a portion of the fluid flow to inlet port 30 is sent to outlet port 34, and a portion of that fluid flow to inlet port 30 is bypassed to discharge port 36. These two blended positions just described are similar, except that the fluid flow through wheel motor 60 is an opposite direction. In each of these blended positions, the relative amount of fluid being directed to wheel motor 60 versus the amount bypassed to discharge port 36 is determined by the precise position of the valve spool, as control by manual operator 190.

Those skilled in the art should appreciate that the energy in the hydraulic fluid under pressure that is not being utilized in wheel motor 60 or that is not being lost through pressure drops in first valve set 20 or in its associated conduits is available to drive wheel motor 80. Due to the substantially identical construction of first valve set 20 and second valve set 64, the fluid pressures between the two valve sets and their respective hydraulic wheel motors tend to equalize very nicely in a reasonably steady-state condition when the mower is traveling forward over reasonably level ground in a substantially straight line. To the extent that any unequal hydraulic pressures may exist that are undesirable, the operator of the mower, by making minor manual adjustments to the relative position of the traction control levers, can easily make compensations so as to keep the mower tracking in a substantially straight line. Such minor corrections to the traction control levers will normally be made instinctively without any real effort of a part of an experienced mower operator, much like an experienced car driver will make slight changes to the steering wheel in order to keep driving a car in a substantially straight line down any given the road without having to think about those steering corrections.

The operation of the FIG. 5 drive system will now be further described to help further explain the functioning of the single-pump, dual-path drive system which is inherently shown therein. With reference to FIG. 5, consider operation of the mower with the left-hand traction control lever for the left wheel drive in its neutral position and the right-hand traction control lever for the right wheel drive being in its full forward position shown. The left traction control lever 190 is raised slightly to place the first control valve 22 in the neutral position against biasing spring 50. As a result, hydraulic pressure from inlet port 30 of valve 22 is diverted to discharge outlet port 36, thereby bypassing left drive motor 60. Also, with valve 22 in its neutral position (envelope 26), hydraulic pressure on outlet port 38 and pilot port 48 will promptly be relieved via controlled leakage to drain 52. As a result, pressure in inlet port 30 will be sufficient to shift slave-operated valve 40 from its at-rest position 47 to full bypass position 49. This shifting changes the flow of hydraulic fluid from the variable volume pump 10 so as to divert the flow away from valve 22, and subsequently the left drive wheel 60, directly to discharge port 18 of valve set 20, where it then enters inlet port 66 or second valve set 64. With directional valve 74 in its full forward position, the pressurized fluid is directed through bypass valve 76 to port 86 of value 74, and onto and through second hydraulic wheel motor 80.

As may be appreciated from FIG. 5, when control lever 190 is further moved so as to place valve 22 into its full reverse position represented by envelope 28, pressure is applied through bypass port 38 so as to allow the slave-operated bypass valve 40 to shift back into its first position 47. This allows fluid to once again flow through first outlet port 44 of slave-operated valve 40 into inlet port 30 of control valve 22. As can be seen in FIG. 5, in the full reverse position 28, the fluid flows from inlet 30 through second output port 16 so as to drive left wheel motor 60 in a reverse direction. The flow leaves left drive motor 60 and enters port 32 of control valve 22 at and is directed to the discharge port 36. Subsequently, the fluid flows through discharge port 18 to inlet port 66 of second valve set 64. The slave-operated valve 40 provides an efficient means to effectively divert fluid energies at very low pressure drops away from control valve 22, and hence wheel motor 60, to second volume control valve 74 and subsequently right drive motor 80.

The functioning of the right valve set 64 is identical to that described for left valve set 20, with the exception that diverted fluids are not directed toward the left wheel 60, but instead are directed back to variable volume pump 10.

Figure 6:
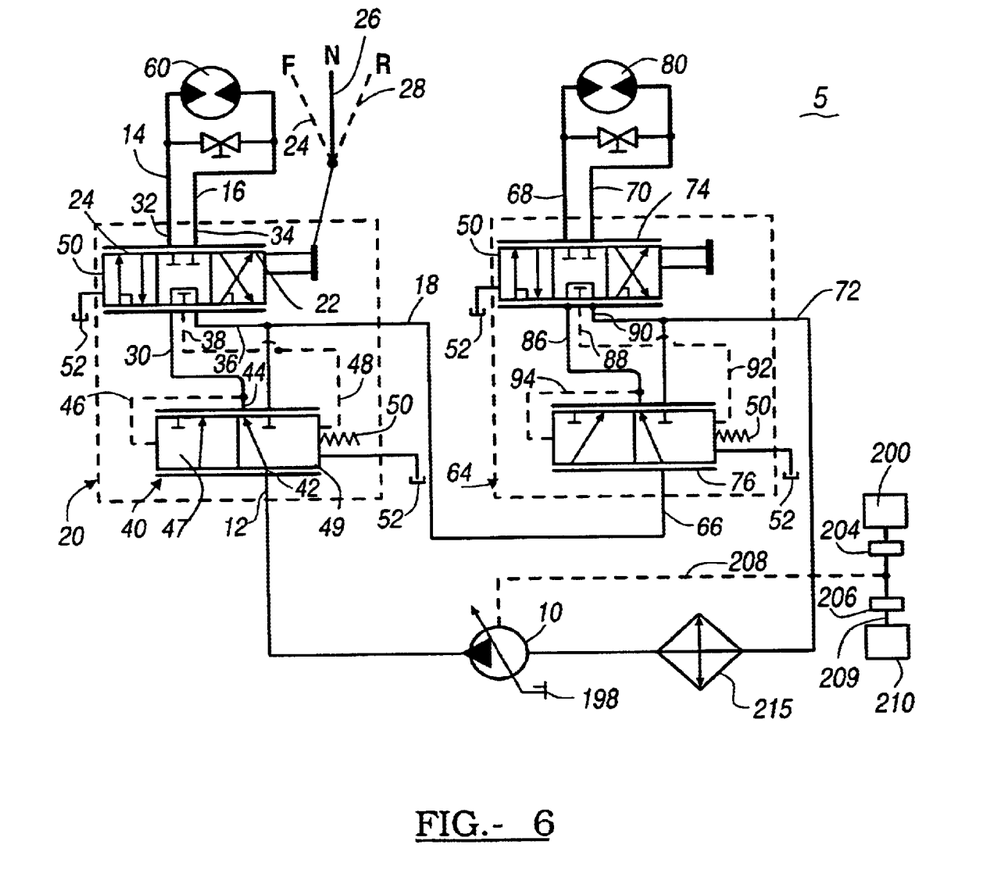
FIG. 6 is a hydraulic drawing of the hydrostatic drive system of the present invention, just like that of FIG. 5, except that the directional control valves of the valve sets are spring-returned to a center position, which is particularly useful for riding mowers.

FIG. 6 shows a hydraulic diagram for another embodiment of the single pump hydrostatic drive system of the present invention. FIG. 6 is similar to the FIG. 5 hydraulic diagram, except that control valves 22 and 74 are spring-returned to a neutral position, and an optional air-to-oil heat exchanger 215 is provided at the inlet line leading to pump 10. By way of background, there are a number of conventional mowers, including sit-down riding mowers and standup platform mowers, which utilize control linkages and/or reversible pumps which return to neutral to provide a braking action upon the driving wheels with the control levers and linkages have been released. For example, in the aforementioned '678 patent to Stuart, left and right operator levers, called coupling members, are independently pivotable control assemblies that the operator of the mower can grasp with his left and right hands. These assemblies or members are pivotably supported along a common axis by a lawn mower handlebar structure that extends from the rear of a midsize commercial mower.

The handle bar shown in that patent serves to limit the forward movement of these coupling members. Pushing the right coupling member or lever forward causes the right rear drive wheel of the mower to be driven forwardly. Pushing the left coupling member forward causes the left rear drive wheel of the mower to be driven forwardly. Upon being released by the operator, the coupling members are returned automatically by a spring force generated by one or more coiled springs to a neutral configuration, wherein the driving forces to the wheels are stopped. Simultaneously, a spring force causes a brake arm to engage a brake band which tightens upon a brake drum, thereby preventing movement of the lawn mower. The braking force on either wheel can be increased by pivoting its respective coupling member in a counterclockwise direction, When the mower is placed in reverse, the lower bar of the coupling member can be used to control the drive of the mower, so the operator movement of the member will correspond to the direction of desired movement. Using the hydraulic system of the present invention, band brakes are not necessary since the hydraulic fluid, once trapped in the lines by the closed center valves 22 and 74 shown in FIG. 5, will not permit the driving wheels to turn. Thus, the control valves 22 and 74 shown in FIG. 5, with their spring-returned to closed center configuration, will inherently provide a braking action as is often desired for sit-down riding mowers and stand-up riding platform mowers. Manually operated shutoff valves shown in parallel with wheel motors 60 and 80 in FIG. 5 are normally closed when the hydraulic system of FIG. 5 is being operated as a self-propelled dual-path hydraulic drive system. When a riding mower using the FIG. 5 system has all power turned off, the mower can be manually moved by simply opening these two manual shutoff valves. When opened, these shutoff valves allow hydraulic fluid to recirculate freely in a loop through the shutoff valve and its respective wheel motor.

While the above description discusses two embodiments of the present invention, it will be understood that the description is exemplary in nature and is not intended to limit the scope of the invention. For example, the invention, while disclosed for use in a commercial walk-behind lawn mower, may also be used for other steerable self-propelled commercial lawn equipment, such as a stand-up or platform mowers, aerators, spreaders and sprayers. Also, other types of operator-controlled, steerable self-propelled mobile equipment that traditionally has used a two-pump dual-path hydrostatic drive system may also beneficially use the single-pump system of the present invention. Such steerable self-propelled mobile equipment includes but is not limited to large vacuum cleaners, cement buggies, pipe and steel rod carriers, sweepers, floor and pavement scrubbers, skid-steer loaders, and agricultural equipment such as windrowers. The present invention, in its broader aspects, will therefore be understood to be applicable for use with such equipment, and also to be susceptible to modification, alteration, and variation by those skilled in the art without deviating from the fair scope of the invention as defined in the following claims.

I claim:

1. In a turf machine including a base mounted on a plurality of wheels and having a turf machine operator interface, a hydraulic control system for regulating the speed and direction of the turf machine, comprising:

an engine;

a hydraulic pump, driven by the engine, having an inlet and an outlet providing a source of unidirectional pressurized hydraulic fluid useful for driving hydraulic motors;

a first valve set having an inlet connected to the hydraulic Pump outlet and a first and second outlet;

a first hydraulic motor having an inlet connected to the first outlet of the first valve set and an outlet;

a second valve set having an inlet connected to the second outlet of the first valve set, further having a first and second outlet, the second outlet being connected to the inlet of the hydraulic pump; and a second hydraulic motor having an inlet connected to the first outlet of the second valve set;

wherein said first valve set contains a first variable volume control valve which regulates volume and direction of fluid flow to the first hydraulic motor; and wherein the second valve set contains a second variable volume control valve which regulates volume and direction of the fluid flow to the second hydraulic motor, said first valve set further containing a first slave-operated pressure compensation valve; and wherein the second valve set further containing a second slave-operated pressure compensated valve.

2. The system of claim 1, wherein the first volume control valve has a first valve which produces a first control signal, the first slave-operated pressure compensation valve being responsive to the first control signal; and the second volume control valve has a first valve which produces a second control signal, the second slave-operated pressure compensation valve being responsive to the second control signal.

3. The system of claim 2 further having cutter blades and a clutch disposed between the engine and the cutter blades.

4. The system of claim 2, wherein the first valve set further contains a spring which will return the first valve set to its forward position when a depending operator lever is released;

the second valve set containing a spring assembly which will return the second valve set to its forward position when it is released.

5. In a turf machine including a base mounted on a plurality of wheels, a hydraulic control system for regulating the speed and direction of the mower comprising:
- a hydraulic Dump, having an outlet and an inlet, for controlling hydraulic fluid flow;
- a first valve set having a first and second inlet connected to the hydraulic pump outlet and a first and second outlet;
- a first hydraulic motor having an inlet connected to the first outlet of the first valve set and an outlet connected to the second inlet of the first valve set;
- a second valve set having a first and second inlet, the first inlet being connected to the second outlet of the first valve set, and further having a first and second outlet, the second outlet being connected to the inlet of the hydraulic pump;
- a second hydraulic motor having an inlet connected to the first outlet of the second valve set and an outlet connected to the second inlet of the second valve set, wherein said first valve set contains a first variable volume control valve which regulates volume and direction of fluid flow to the first hydraulic motor, wherein the second valve set contains a second variable volume control valve which regulates volume and direction of the fluid flow to the second hydraulic motor, said first valve set further containing a first slave-operated pressure compensation valve; and
- wherein the second valve set further containing a second slave-operated pressure compensated valve.

6. The system of claim 5, wherein the first volume control valve has a first valve which produces a first control signal, the first slave-operated pressure compensation valve being responsive to the first control signal.

* * * * *

UNITED STATES PATENT AND TRADEMARK OFFICE
CERTIFICATE OF CORRECTION

PATENT NO.    : 6,662,895 B1
DATED         : December 16, 2003
INVENTOR(S)   : Richard D. Bednar It is certified that error appears in the above-identified patent and that said Letters Patent is hereby corrected as shown below:

Column 3,
Line 36, "is" should be -- in --.
Line 45, "conduct" should be -- conduit --.

Column 8,
Line 42, after "represented" insert -- by --.
Line 54, "output" should be -- outlet --.
Line 63, after "Figure" insert -- 5 --.

Column 9,
Line 8, both occurrences of "output" should be -- outlet --.

Column 10,
Line 8, "control" should be -- controlled --.
Line 30, delete "the".
Line 56, "value 74" should be -- valve 74 --.

Column 11,
Line 2, delete "at".

Column 12,
Line 31, "Pump" should be -- pump --.

Column 13,
Line 4, "Dump" should be -- pump --.

Signed and Sealed this

Twenty-ninth Day of June, 2004

JON W. DUDAS
*Acting Director of the United States Patent and Trademark Office*